United States Patent
Ben-Itzhak

(10) Patent No.: US 9,280,391 B2
(45) Date of Patent: Mar. 8, 2016

(54) SYSTEMS AND METHODS FOR IMPROVING PERFORMANCE OF COMPUTER SYSTEMS

(75) Inventor: Yuval Ben-Itzhak, Brno (CZ)

(73) Assignee: AVG Netherlands B.V., Amsterdam (NL)

( * ) Notice: Subject to any disclaimer, the term of this patent is extended or adjusted under 35 U.S.C. 154(b) by 581 days.

(21) Appl. No.: 12/861,025

(22) Filed: Aug. 23, 2010

(65) Prior Publication Data

US 2012/0047509 A1 Feb. 23, 2012

(51) Int. Cl.
*G06F 9/46* (2006.01)
*G06F 9/50* (2006.01)
*G06F 9/48* (2006.01)
*G06F 11/34* (2006.01)

(52) U.S. Cl.
CPC ............... *G06F 9/50* (2013.01); *G06F 9/4881* (2013.01); *G06F 9/5038* (2013.01); *G06F 11/3409* (2013.01); *G06F 11/3438* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 5,469,571 A * | 11/1995 | Bunnell | G06F 13/26 718/103 |
| 5,748,468 A | 5/1998 | Notenboom et al. | |
| 6,092,194 A | 7/2000 | Touboul | |
| 6,167,520 A | 12/2000 | Touboul | |
| 6,230,204 B1 | 5/2001 | Fleming, III | |
| 6,480,962 B1 | 11/2002 | Touboul | |
| 6,671,802 B1 | 12/2003 | Ott | |
| 6,687,821 B1 | 2/2004 | Hady et al. | |
| 6,742,141 B1 * | 5/2004 | Miller | 714/26 |
| 6,745,221 B1 | 6/2004 | Ronca | |
| 6,829,764 B1 | 12/2004 | Cohen et al. | |
| 6,988,139 B1 * | 1/2006 | Jervis | G06F 9/5038 709/224 |
| 7,020,697 B1 | 3/2006 | Goodman et al. | |
| 7,093,035 B2 | 8/2006 | Hashimoto | |
| 7,137,119 B1 | 11/2006 | Sankaranarayan et al. | |
| 7,143,413 B2 | 11/2006 | McCarthy et al. | |
| 7,165,250 B2 * | 1/2007 | Lyons | 717/177 |
| 7,178,147 B2 | 2/2007 | Benhase et al. | |
| 7,325,234 B2 | 1/2008 | Smith | |
| 7,430,741 B2 | 9/2008 | Ayachitula et al. | |
| 7,437,728 B2 * | 10/2008 | Stackhouse | G06F 9/5066 709/223 |
| 7,565,656 B2 | 7/2009 | Yamasaki et al. | |
| 7,590,406 B2 | 9/2009 | Aaltonen et al. | |
| 7,594,229 B2 | 9/2009 | Hirschsohn | |
| 7,603,671 B2 | 10/2009 | Liu | |
| 7,620,950 B2 | 11/2009 | Mathias et al. | |
| 7,711,789 B1 | 5/2010 | Jnagal et al. | |
| 7,748,005 B2 | 6/2010 | Romero et al. | |

(Continued)

FOREIGN PATENT DOCUMENTS

WO WO-2004027613 4/2004

OTHER PUBLICATIONS

International Search Report for PCT/IB2011/002563 dated Mar. 26, 2012 (6 pages).

(Continued)

*Primary Examiner* — Hiren Patel
(74) *Attorney, Agent, or Firm* — Kramer Levin Naftalis & Frankel LLP

(57) ABSTRACT

Priorities of an application and/or processes associated with an application executing on a computer is determined according to user-specific usage patterns of the application and stored for subsequent use, analysis and distribution.

21 Claims, 5 Drawing Sheets

(56) References Cited

U.S. PATENT DOCUMENTS

| | | | |
|---|---|---|---|
| 7,899,994 B2* | 3/2011 | Zhao et al. ................ 711/133 |
| 8,205,205 B2* | 6/2012 | Franke ................ G06F 9/5038 |
| | | | 709/201 |
| 8,286,174 B1* | 10/2012 | Schmidt et al. ............ 718/104 |
| 8,424,007 B1* | 4/2013 | Hernacki et al. ........... 718/103 |
| 9,135,002 B1* | 9/2015 | Tarassov ................ G06F 9/00 |
| 2001/0021913 A1* | 9/2001 | Leymann ............ G06Q 10/10 |
| | | | 718/103 |
| 2002/0007389 A1 | 1/2002 | Jones et al. |
| 2003/0078808 A1* | 4/2003 | Ng et al. ........................ 705/3 |
| 2003/0167270 A1 | 9/2003 | Werme et al. |
| 2004/0023646 A1* | 2/2004 | Inami et al. ................ 455/418 |
| 2005/0114601 A1* | 5/2005 | Ramakrishnan ........... 711/118 |
| 2005/0177832 A1* | 8/2005 | Chew ........................ 718/104 |
| 2006/0064698 A1 | 3/2006 | Miller et al. |
| 2007/0043860 A1* | 2/2007 | Pabari ........................ 709/224 |
| 2007/0079021 A1* | 4/2007 | Dees et al. .................... 710/40 |
| 2007/0198982 A1 | 8/2007 | Bolan et al. |
| 2007/0226696 A1 | 9/2007 | Radhakrishnan et al. |
| 2007/0226697 A1 | 9/2007 | Barsness et al. |
| 2007/0261030 A1 | 11/2007 | Wadhwa |
| 2008/0022286 A1 | 1/2008 | Chung et al. |
| 2008/0034370 A1 | 2/2008 | Huizenga |
| 2008/0052719 A1 | 2/2008 | Briscoe et al. |
| 2008/0104080 A1* | 5/2008 | Copeland et al. ............ 707/10 |
| 2008/0104605 A1 | 5/2008 | Steinder et al. |
| 2008/0147684 A1* | 6/2008 | Sadovsky et al. .......... 707/100 |
| 2008/0222163 A1* | 9/2008 | Hild et al. .................... 707/10 |
| 2008/0244600 A1 | 10/2008 | Wong et al. |
| 2008/0263401 A1 | 10/2008 | Stenzel |
| 2009/0070337 A1* | 3/2009 | Romem et al. ............... 707/10 |
| 2009/0119773 A1* | 5/2009 | D'Amore et al. ............ 726/21 |
| 2009/0125619 A1* | 5/2009 | Antani ........................ 709/223 |
| 2009/0132607 A1* | 5/2009 | Danesi et al. ............... 707/202 |
| 2009/0158288 A1* | 6/2009 | Fulton ................ G06F 9/4881 |
| | | | 718/103 |
| 2009/0178042 A1* | 7/2009 | Mehta ................ G06F 9/4881 |
| | | | 718/101 |
| 2009/0178045 A1* | 7/2009 | Gupta ................ G06F 9/5016 |
| | | | 718/103 |
| 2009/0198766 A1 | 8/2009 | Chen et al. |
| 2009/0217202 A1* | 8/2009 | Foley et al. ................ 715/810 |
| 2009/0265707 A1 | 10/2009 | Goodman et al. |
| 2009/0307696 A1* | 12/2009 | Vals et al. .................. 718/102 |
| 2010/0011365 A1 | 1/2010 | Gerovac et al. |
| 2010/0030785 A1 | 2/2010 | Wilson et al. |
| 2010/0083264 A1* | 4/2010 | Mehta ................ G06F 9/5011 |
| | | | 718/103 |
| 2010/0107172 A1 | 4/2010 | Calinescu et al. |
| 2010/0122263 A1* | 5/2010 | Didi ................ G06F 9/4887 |
| | | | 718/107 |
| 2010/0162257 A1 | 6/2010 | Hiltunen et al. |
| 2010/0257533 A1* | 10/2010 | Dvir et al. .................. 718/103 |
| 2011/0067032 A1* | 3/2011 | Daly ................ G06F 9/4881 |
| | | | 718/103 |
| 2015/0058858 A1* | 2/2015 | Plattner ................ G06F 9/4881 |
| | | | 718/103 |
| 2015/0193240 A1* | 7/2015 | Ben-Itzhak ........... G06F 9/4406 |
| | | | 718/100 |

OTHER PUBLICATIONS

Windows Systems Resource Manager Overview—2010 Microsoft Corporation. http://technet.microsoft.com/en-us/library/cc731995(printer).aspx (3 pages).

Linux.com :: Influence scheduling priority with nice and renice, http:www.linux.com/archive.feed/58638 (5 pages).

Mz Cpu Accelerator page—http://www.mztweak.com/MzCpu/html retrieved Aug. 17, 2010 (2 pages).

* cited by examiner

SYSTEMS AND METHODS FOR IMPROVING PERFORMANCE OF COMPUTER SYSTEMS

FIELD OF THE INVENTION

The invention relates generally to the field of optimizing performance of computer applications, and, more specifically, to systems and methods which implement task and processing prioritization rules among applications and processes to optimize the utilization of computer resources.

BACKGROUND

A typical computer executes several user applications simultaneously. For example, users often have an e-mail program, a web browser, document-processing software, spreadsheets and even virtual machines running on one computing device at the same time. Further, each user application may require the operation of multiple tasks such as receiving and/or sending data from/to the computer's storage (i.e., memory, internal drives, etc.) or a network (e.g., the Internet), performing logic operations on the main processor, processing and rendering audio and video, and/or performing operations on a co-processor. Each of these tasks is executed by the computer as one or more processes. The tasks associated with non-user applications such as the computer's operating system are also executed as various processes. For example, the Windows XP operating system generally runs up to 80 processes simultaneously, even when only a few user applications are operating.

The performance of a process, and as a result, the performance of the application associated with the process, is related to the resources required to execute the process and the availability of the those resources. The resources commonly include the number of processors (also called CPUs) in the computer, the CPU speed, cache-memory size and speed, latency of main memory and/or disk access, availability of network ports, and co-processor speed. Overall resource availability is inversely related to the number of processes being executed by the computer, the sharing of the computer's resources during a certain time period, and, in some cases, to a priority assigned to a particular process or application. The process priority influences resource sharing such that the higher the process priority, the more quickly and frequently resources made available to the process, thereby increasing the performance of the process and the associated application. In conventional systems, the priority is assigned by the operating system, and in certain instances a user may manually alter these priorities.

However, the operating system lacks critical knowledge of how best to assign priorities to different user applications and the associated processes in order to optimize the user experience. Therefore, the operating system generally assigns the same priority to all user applications and the corresponding processes. As a result, when the computer runs several processes simultaneously, the performance of all user applications tends to be substantially similar. This, however, is sometimes inconsistent with a user's preferences, and likely does not consider the actual processing requirements of the application or process. For example, a business user may ascribe a higher priority to a data analysis and/or e-mail application than a web browser or a power-usage-monitoring application. Similarly, a home user may want an instant messaging application and a voice-over-IP (VoIP) application to utilize a greater share of the CPU than a document-processing application.

In order to improve the performance of a computer system, some systems employ CPU or task scheduling. In these systems algorithms such as first-in-first-out (FIFO), shortest-job first, round-robin scheduling, priority scheduling, and multi-level queue scheduling are employed to determine the order in which tasks are scheduled and executed. The objective of these methods, however, is to improve the performance of the overall computer system, and not to improve the performance (e.g., the total execution time, response time, etc.) of a particular user application. Moreover, these systems and methods only account for the characteristics of the various tasks being executed and do not consider the user's preferences or other environmental factors. Therefore, a user may feel that a certain application does not perform as well as expected, and the user may mistakenly believe he needs to upgrade to a more expensive computer having a more powerful processor and/or more memory.

Some systems allow a user to lower the priority of a particular process, so that the performance of the other processes can improve. But, such a method presents several problems to a user. First, the user must determine which processes are associated with which application. Second, the user must identify many applications for which she does not expect high performance, and lower the priorities of the processes associated with those applications. Finally, once the user lowers the priority of a process, it cannot be increased later, even if the user changes her preference. In sum, such an approach requires the user to have significant technical knowledge about their applications and operating system, and requires constant manual intervention.

Some other systems identify an active application (e.g., an application in the window of which the user clicked recently) and increases the priorities of the processes associated with that application. Such a system may not comport with a user expectation, however, if the user prefers that a background application such as data analysis have high performance, while user actively engages with another application such as web browser only while waiting for the data analysis to be completed. Therefore, there is a need for improved methods and systems that enable a computer system to increase the performance of one or more applications according to the users' expectations.

SUMMARY OF THE INVENTION

In various embodiments of the present invention, the performance of one or more applications and/or computing processes is optimized based on various application usage parameters. This is achieved, in part, by setting the priorities of some user applications according to expressed, discovered, and/or inferred user or group preferences. In order to infer these preferences, usage patterns of various applications are monitored and stored in a local database. If the usage of an application is determined to be heavy with regard to parameters such as CPU time, frequency of execution, data caching, etc., it may be inferred that the user expects the performance of that application to be high relative to other applications. The processes associated with applications expressly indicated or determined according to a usage pattern as requiring high performance are identified and their priorities are set as such. The priorities of the applications are stored in the local database for future use.

The usage pattern of a particular application can change with the time of the day, day of week, shift, or other time-based parameter. For example, a user may run an e-mail application all day but may respond to e-mails more frequently in the morning and evening. Accordingly, the priorities of the same application (e.g., the e-mail program) can be set differently at different times in response to the observed usage pattern. The priorities can also be set in real-time by monitoring the real-time usage of the applications running during a certain time period. In particular, if a user interacts (e.g., by clicking on windows or on buttons in windows, etc.) with one or more applications more frequently in a certain time period, the priorities of the corresponding applications are set higher than other applications which are not used as frequently.

In some embodiments, the application usage and priority database may be shared with a centralized database. In the centralized database, multiple individual databases, each received from a community of users, are aggregated so as to suggest priorities for various applications among groups of users. Because, for example, a user running an application for the first time lacks adequate usage data from which a usage pattern can be determined, the priority of the application for that user may not be accurate or based on an atypical usage pattern. However, the suggested priority from the centralized database can be used to set an initial priority of the application (or a suite of applications) for that user. In general, according to the systems and methods of the present invention, some user applications are assigned higher priorities than others based on usage of those applications. This can improve the performance of those applications, matching the user's expectations without needing another computer.

Accordingly, in one aspect, a method of prioritizing the execution of applications by a computer includes programmatically monitoring computer application usage patterns and maintaining a database of computer applications requiring computing resources. The execution priorities for the applications are determined based on the usage patterns of computer applications. The database is updated with the execution priorities, and computing resources are allocated to the computer applications based on the determined priorities. Thus, the execution of the computer applications is influenced by the application usage patterns, and can increase the performance of those applications.

In some embodiments, the computer applications include an operating system and/or a virtual machine. The execution of the computer applications may include the execution of a multiple processes, in which case determining the execution priorities of applications includes determining the execution priorities for each process. The execution priorities for each process associated with one application can differ among processes.

In some embodiments, the step of monitoring computer application usage patterns includes detecting a time of day the applications are used, detecting a duration for which the applications are used, and/or detecting the frequency the applications are used during a specified time period. Monitoring the usage patterns may also include detecting the functions and/or transactions executed from within the applications, and detecting an active window (i.e., a window or screen in which the user most recently clicked) within an application. The computing resources allocated among the applications may include CPU time, memory, storage, and/or bandwidth.

In some embodiments, the database in which the priorities are stored may be located on a local client device associated with an individual user, whereas in other embodiments the database may also (or alternatively) be stored at a remote server. The execution priority databases obtained from other users may be merged within a database located at a remote server, thereby resulting in a centralized execution priority database. By performing a statistical analysis of the centralized execution priority database (e.g., computation of the mean and variance of the priorities of a particular application), a common execution priority database can be determined. In some embodiments the common execution priority database can be distributed local devices, where it may serve as an initial execution priority database for the local devices.

According to a second aspect, a system for prioritizing the execution of processes by a computer includes a monitoring module for programmatically monitoring computer application usage patterns and a prioritization module for determining the execution priorities for the computer applications. The execution priorities are determined based on the application usage patterns. The prioritization module also allocates computing resources (e.g., CPU time, memory, etc.) to the computer applications based on the determined priorities. The system also includes a data storage module for storing identities of the computer applications (e.g., application names, product keys, a record identifying a user running the application, etc.) and the execution priorities. One or more of the monitoring module, prioritization module, and data storage module may reside on the user's local computer.

According to a third aspect, a centralized application-performance management system includes a communications server for receiving several locally-compiled databases from different users. Each database includes identities of computer applications and/or processes having been executed on local machines and execution priorities associated with those applications. The identities of the computer applications and execution priorities are based on computer application usage patterns that may be detected and in some cases stored on the respective local machines of the various users. The management system also includes an aggregation module for aggregating the locally-compiled databases and a central data storage module for storing the locally-compiled databases and the aggregated database.

In some embodiments, the application-performance management system also includes an analysis engine. The analysis engine statistically analyzes the aggregated database (and, in some cases the locally-compiled databases individually) and determines the application usage patterns among the local machines. The analysis engine may also compile a model application usage priority database based at least in part on the analysis of the aggregated databases, which may be stored on the data storage module. The communication server may distribute the model application usage priority database to local machines. Using the model usage information, a user's local computer can determine the priority of an application running on the local computer.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
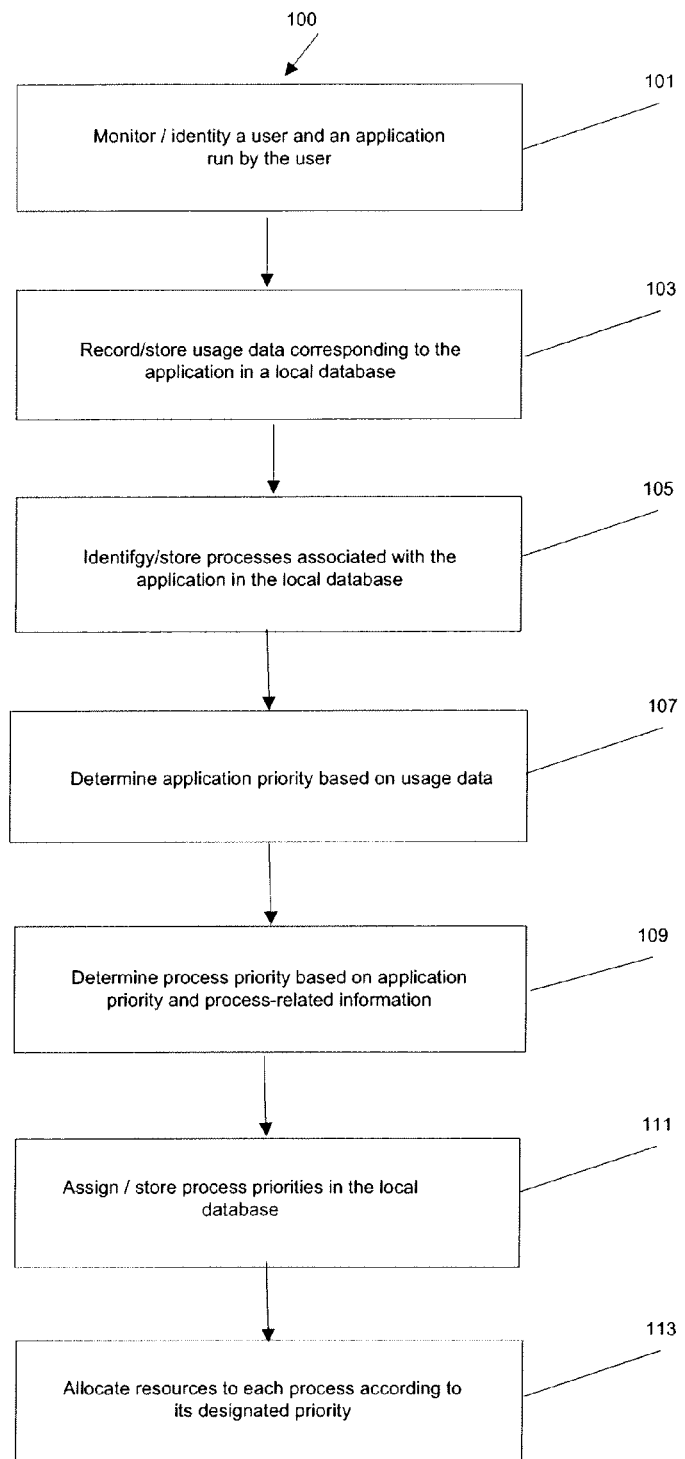
FIG. 1 shows a flow diagram of the steps performed in determining an application priority based on the application-usage data obtained from one user.

One embodiment of a method 100 for determining application priorities is illustrated with reference to FIG. 1. In step 101, the applications being run by a user are monitored and identified. For example, it may be determined that at a certain time a user was running an email application and a web browser, while at another time, the user was running an email application and a tax-preparation application. An application can be identified, for example, by the application name, the executable file associated with the application, a product key, a user-supplied moniker, etc. In addition, in step 101 the user running the application is identified by user name, user id, or other unique key, thus facilitating the collection of user-specific application-usage data. In some embodiments, the identification of the user may correspond to an individual, whereas in other cases a user may be a class including multiple individuals having the same or similar role (e.g., administrator, clerk, receptionist, trader, etc.) or sharing a common ID. In some instances, a user may refer to an automatic processor (including virtual machines), causing the execution of applications and/or processes on another computer. It should be understood, however, that user identification is optional and that embodiments in which a user is not identified are within the scope of the invention.

In step 103, data relating to the application usage are collected and stored in a database on the user's computer. As used herein the term "computer" refers to any computational device used to execute applications, including, for example, desktop computers, laptops, netbooks, tablets (e.g., an IPad) servers, hand-held devices (e.g., an IPhone or Droid-based phone), personal data assistants, smartphones, and the like. The usage data generally include the time of the day at which an application is started, duration of usage once the application is started, frequency of invoking an application, frequency of the user's interaction with the application, etc. The frequency of the user's interaction can be determined by monitoring actions such as clicking or typing in a window of the application using various input devices such as a mouse, keyboard, microphone, touch-screen, etc.

In step 103, the usage data are collected periodically (e.g., every 5 or 30 minutes) but may also be collected at random intervals. The application-usage data may change from time-to-time (e.g., hour-to-hour, day-to-day, week-to-week, etc.) and/or may also vary at random intervals. For example, every day in the morning a user may start running an email application, a document-management application, and a text editor. Although the three applications are started substantially simultaneously, the user may interact with the email application more frequently for approximately a half hour and then may use the text editor extensively thereafter.

Typically for each application in use, the computer runs more than one process that is associated with the application. Some processes may correspond to functions performed by the applications (e.g., numerical and/or logical computations, graphics processing, and/or memory input/output operations) whereas others may include communication processes such as establishing network connectivity. Other processes may correspond to transactions (e.g., direct memory transfer, network input/output, etc.) carried out by the application. Moreover, one application, such as a web browser, can invoke another application, such as a PDF document viewer. In that case, more than one application, and the processes associated with each, are being executed and are related to one another. In step 105, the processes associated with an application are identified and stored in a local database. The relationships among different applications and the associated processes may also identified and stored in the database in step 105.

Using the usage data collected in step 103, a priority of an application is determined in step 107. Typically, an application used more frequently and/or more extensively at a certain time is assigned a higher priority relative to other applications at that time. A more extensive use of an application can be inferred from the recorded usage characteristics such as the number of clicks in an application window, data transmissions sent or received over a network, screen renderings, etc. The designation of priorities based on usage data is illustrated referring to the above-discussed example of a user starting three applications every morning. The email application is initially assigned a high priority when the user may be engaged in reading and/or sending emails. At a later time, however, the text editor is assigned a high priority as the user may transition from sending/reading emails to editing documents.

Furthermore, in step 109, the priority of each process associated with the application is determined based on the application priority as determined in step 107. A process is assigned a priority at least as high as that assigned to the corresponding application. Furthermore, based on process-related information such as whether the process involves memory operations or graphics operations the process may be assigned a higher priority than that of the corresponding application. In some embodiments, though, all processes associated with an application are assigned the same priority as that of the application. The assigned process priorities may also be stored in the local database in step 111.

Finally, in step 113 the computer allocates resources to the processes according to the designated priorities. The examples of resources include the number of processors, CPU time, cache memory size, etc. Even though the resources are shared by several processes running substantially simultaneously, a process assigned a higher priority in step 111 receives a relatively larger share of the resources. For example, the high-priority processes may run concurrently on two or more processors while the other processes are allowed to run on only one processor. In some embodiments, the other processes may also be run concurrently on more than one processor, but the number of processors available to the low-priority processes is less than that available to the high-priority processes. Alternatively or in addition, the high-priority process may receive more CPU time and/or memory space compared to low-priority processes. Therefore, a high-priority process may execute faster than it would without being designated a high priority in step 109. As a result, the performance of the associated application can improve.

Figure 2:
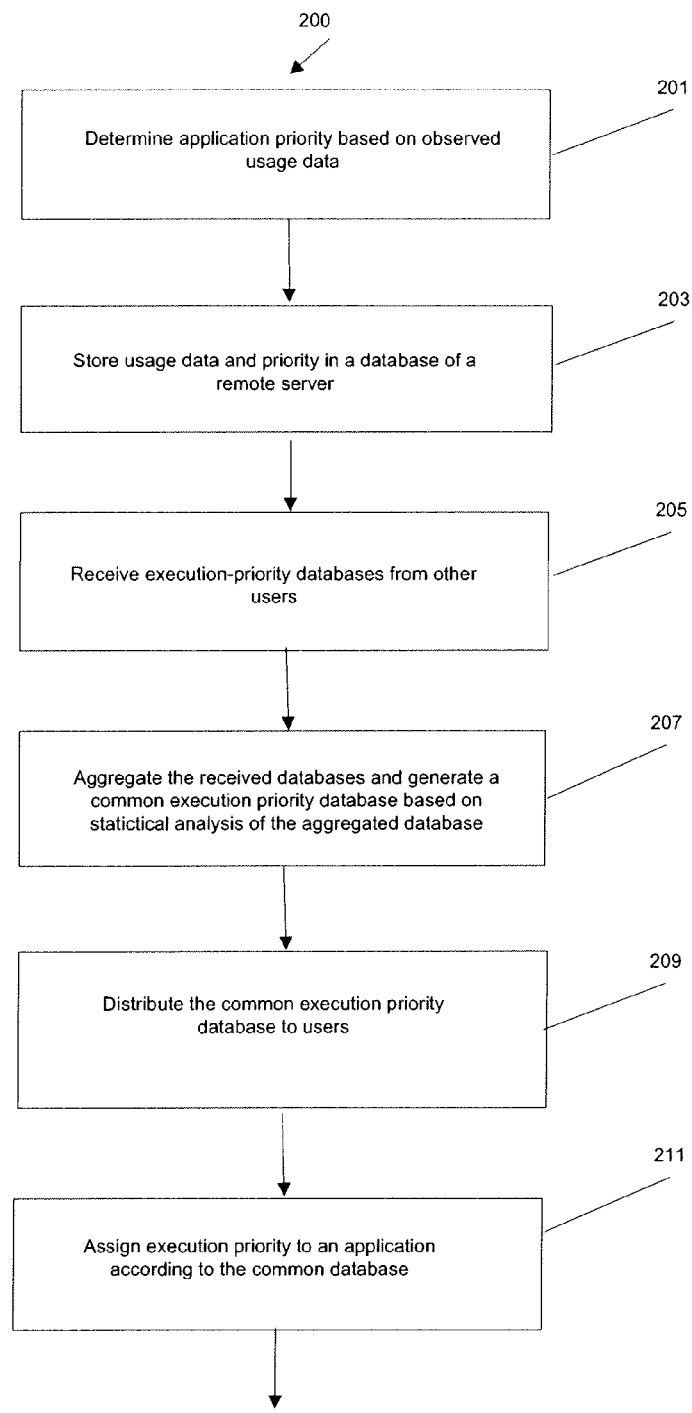
FIG. 2 shows a flow diagram of the steps performed in determining an application priority based on the usage data obtained from several users.

The priority of an application can be determined based on usage data collected from a single user (as described above with reference to FIG. 1), or by collecting usage data from different users using different computers. Accordingly, in the embodiment of a process depicted in FIG. 2, the application data collected by individual users are shared to determine application priorities across a group of users. In step 201, priorities of applications are determined based on their usage observed at one computer, as described above with reference to FIG. 1. The usage data and the determined application priorities are stored in a database located at a remote server in step 203. In some embodiments these data and the determined priorities are also stored in a local database. In step 205, the remote server receives execution priority databases generated by other users using different computers.

The various databases received from different users are aggregated in step 207. Aggregation can be accomplished, for example, by compiling a list or a suitable data structure containing the priorities obtained from different databases for a particular application based on common application identifiers, process names and other keys. The corresponding usage data may also be compiled in a similar manner. Using the usage data, the priorities are analyzed statistically in step 207. Some methods of statistical analysis include calculating a simple average of all priorities of an application. Alternatively, a weighted average of the priorities can be computed where the weights relate to a characteristic of the usage data such as the size or age of the data, the user (or group of users) from which the data was collected, characteristics of the computer on which the applications were executed, as well as others. A common execution priority database is generated in steps 207 in which an application is assigned a priority based on aggregation and statistical analysis described above.

The common execution priority database may then be distributed to the users in step 209. At a user's computer, the priority of an application is assigned according to either the local database (if it was stored in step 203) or the common database. In some situations, a priority assigned from a common database can better match the user's expectation if the user is running the application for the first time or has previously run it only a few times. In these situations, the local database may not contain adequate usage data, and hence, the application priority according to the local database may be inaccurate. The common database, however, may include adequate usage data obtained from other users who may use their computers in a similar manner or are members of a common group and thus may provide a more accurate execution priority.

Figure 3:
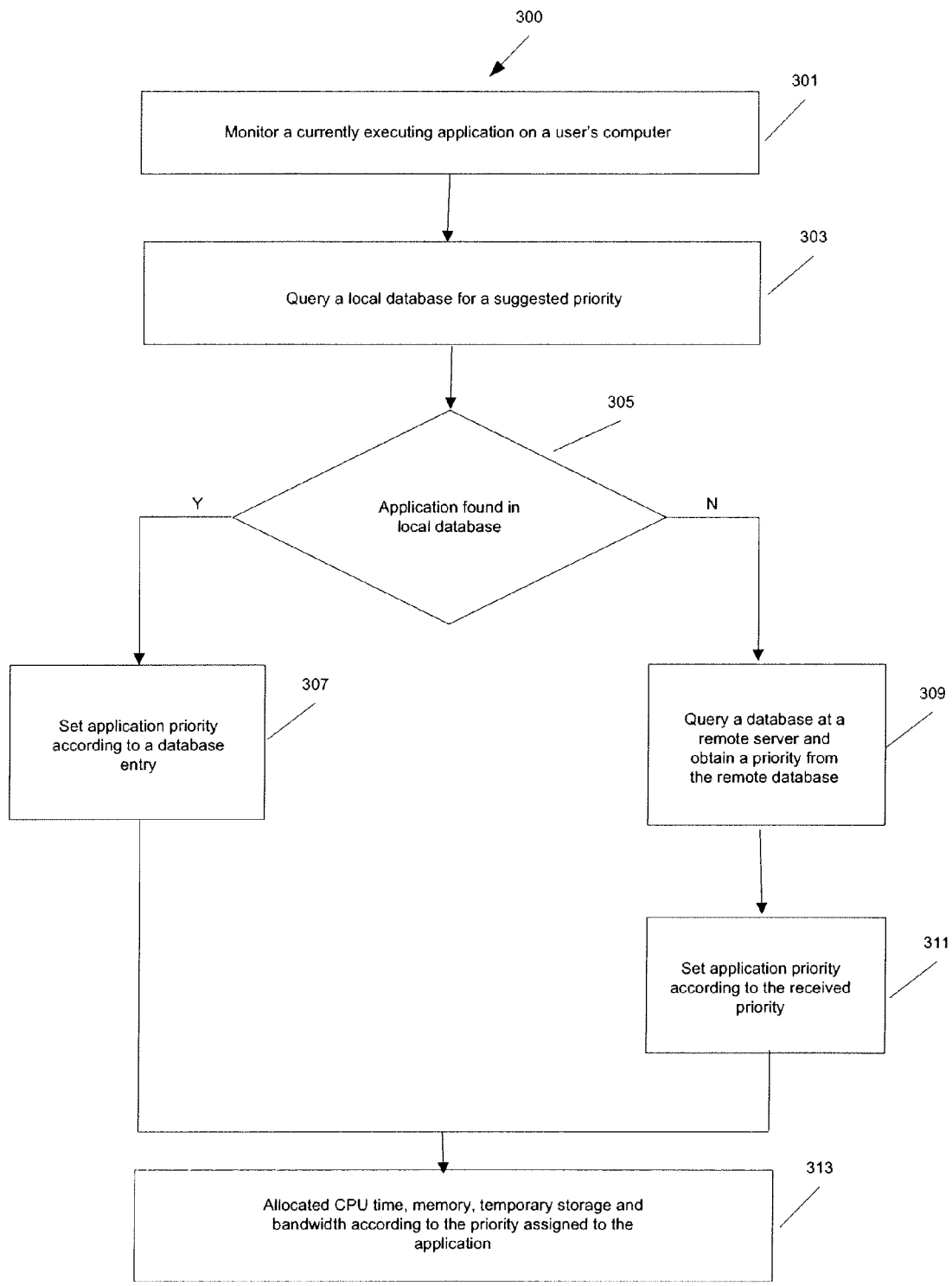
FIG. 3 shows a flow diagram of the steps performed in setting an application priority based on the priority obtained from a local or remote database.

In the embodiment illustrated in FIG. 3, an application executing on a user's computer is monitored in step 301. In step 303, the local database is queried to request a priority for the application. It is determined in step 305 whether the local database contains an entry for the application. If an entry is found, the execution priority for that application is set as specified in the local database in step 307.

If the application is not found in the local database, a remote server is queried in step 305. The remote server contains a common execution priority database as described with reference to FIG. 2. The priority for the application is received from the common database in step 309, and is assigned to that application in step 311. The processes associated with the application may also be assigned a priority at least as high as the application priority. Finally, in step 313 resources such as CPU time, memory, temporary storage, and bandwidth are allocated to the application (i.e., to the processes associated with the application) according to the application (or process) priorities assigned in step 309.

Figure 4:
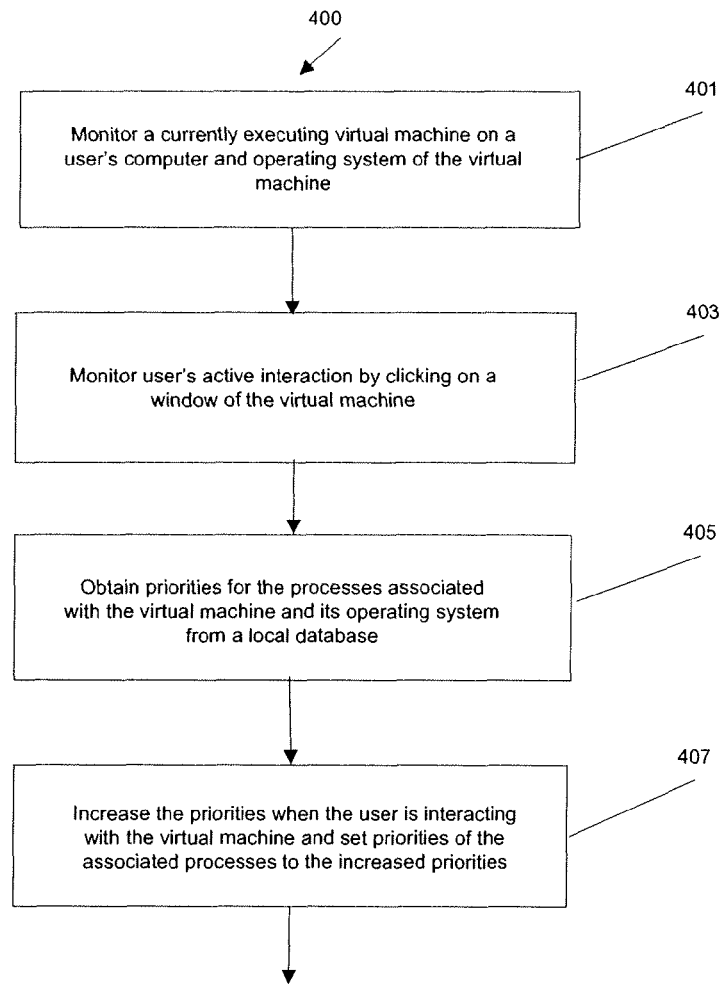
FIG. 4 shows a flow diagram of the steps performed in adjusting the priorities of currently executing applications in real time.

A priority assigned to a currently executing process can be adjusted in real time (i.e., while the application is running) as illustrated with reference to FIG. 4. In step 401, a currently executing virtual machine and the operating system of the virtual machine are monitored. In step 403, the user's interaction with the virtual machine is monitored. For example, data relating to the number of times a user clicks on windows in applications operating on the virtual machine or types using the keyboard in such windows may be recorded.

In step 405, priorities for the processes associated with the virtual machine and its operating system are obtained from a local database. A local database of usage data and priorities can be generated as described above with reference to FIG. 1. The user's current usage in a certain time period is compared with the usage data obtained from the database in step 407. If the current usage is higher than that recorded in the database this may suggest that the user is actively interacting with the virtual machine. Accordingly, in step 407 the priorities designated to the processes of the virtual machine and its operating system are increased. Alternatively, if it is observed at a certain time that the usage of an application is less than that recorded in the database, the priority of that application and the associated processes can be lowered. This may allow other more actively used applications to perform faster, thus meeting the user's expectations with respect to the other applications.

Figure 5:
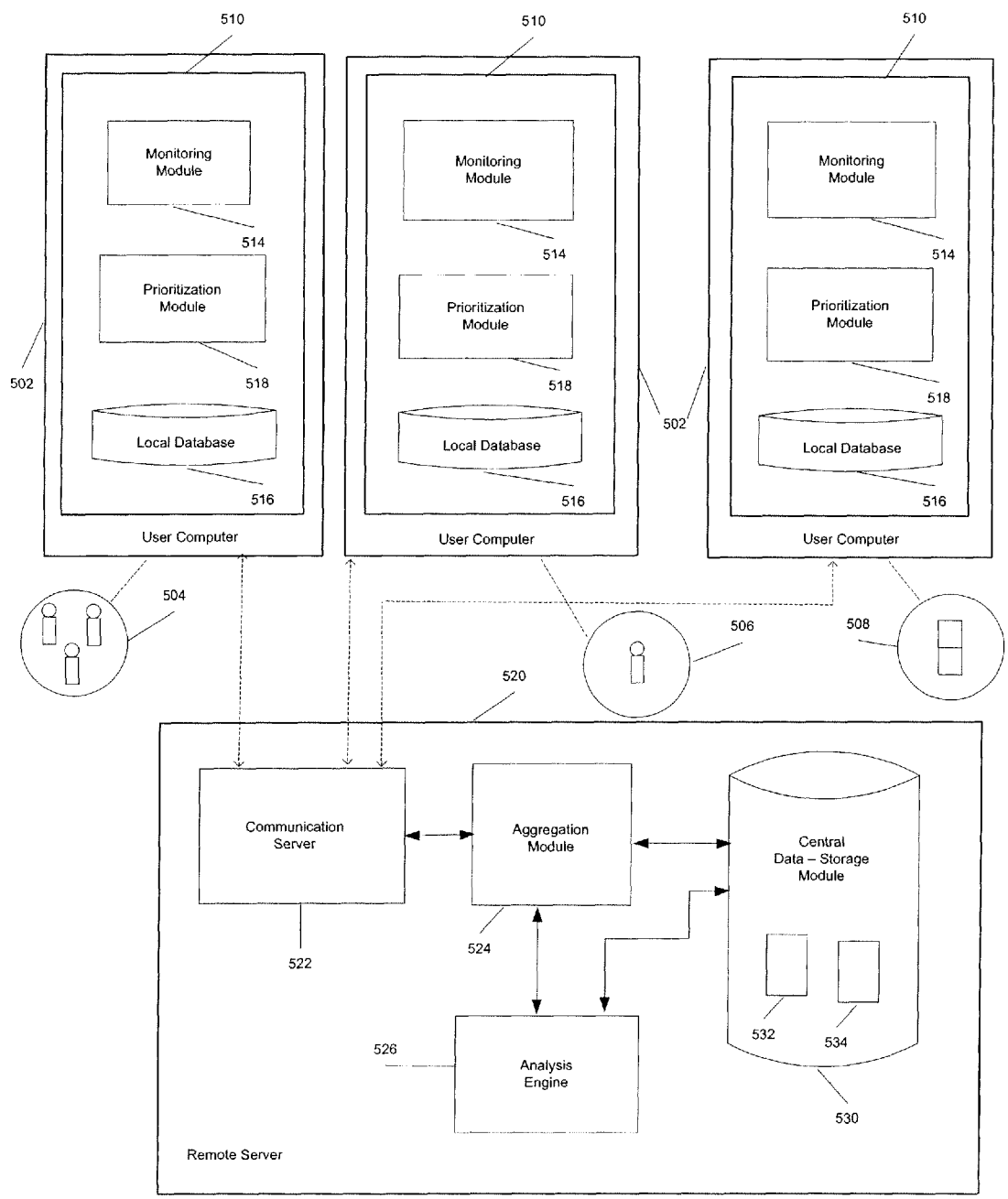
FIG. 5 schematically depicts a centralized application-performance management system including a priority-determination system.

Referring to FIG. 5, a centralized application-performance management system 500 in which various embodiments of the invention may be implemented includes a priority-determination system 510. The system 510, residing on a user computer 502, further includes a monitoring module 514 that monitors applications being executed on the user's local machine and records the usage of an application as described above with reference to FIG. 1. A user can be an individual 506, or a class of individuals associated with each other 504. For example, the user 504 can be a group of data-entry operators sharing a common user ID, or a group of individuals having a common job within an organization or company such as doctors sharing a common workstation in a hospital, accountants that use the same computers and/or applications, or teachers. The user 508 is a server running applications on the computer 510.

In some embodiments, the monitoring module 514 may also identify the user and associate the user's ID with his application usage history. The relationships between various applications (e.g., a web browser invoking a PDF viewer or a video player) may also be observed and recorded by the monitoring module 514 in order to allow a common priority to be assigned to different applications. The monitoring module 514 may also identify individual processes associated with the applications as they are executed on the user's local machine. The application-usage data and information regarding the associated processes are stored in a local database 516 included in the priority-determination system 510.

The prioritization module 518 analyzes the usage data and determines a priority for the application. In general, the more frequent or greater the usage of an application, the higher the priority of that application. The prioritization module 518 may designate the same priority to two or more different applications if it determines that the usage of those applications is substantially similar and/or of the applications routinely interact with each other. For example, a user engaged in writing an article and conducting research for the article may use a web browser and a text editor substantially simultaneously. Moreover, the frequencies of usage of the web browser and the text editor may be similar, both frequencies being greater than usage frequencies for other applications, such as email, also being run by the user at that time. Accordingly, the prioritization module 518 may assign a high priority (e.g., 10) to the web browser and the text editor, and may assign a low priority (e.g., 20) to the email application.

Because a user may use multiple applications simultaneously, he may expect the performance those applications to be higher than that of other applications. As such, the same high priority may be assigned to certain applications. It should be understood, however, that the designation of priorities described above is illustrative only, and that the prioritization module 518 may be configured to designate a distinct priority to each application. In that case, priorities assigned to the text editor, web browser, and email application may be 10, 12, and 20, respectively. In the examples above, a lower number generally designates a higher priority. In some embodiments a greater number (or another designation) can indicate a higher priority.

The centralized system 500 also includes a remote server 520 that includes a communication server 522. The communication server 522 is configured to receive local databases 516 from different users. The communication server 522 can also receive queries from a user computer 502 requesting a priority for an application. The communication server 522 distributes the model database (described below) and/or the requested priority information to one or more user computers 502.

The aggregation module 524 aggregates, as described above with reference to FIG. 2, the usage data and priority information from the various databases received via the communication server 522. In particular, for a certain application, the aggregation module 524 may compile a list of priorities obtained from the received databases in which the usage history of that particular application was recorded at various local machines. In addition, the aggregation module 524 may compile a data structure containing various types of usage data obtained from the received databases for that application. These aggregated data are stored in an aggregated database 532 contained in the central data-storage module 530.

The analysis engine 526 analyzes the aggregated information generated by the aggregation module 524 and the aggregated usage data from the database 532. Based on the analysis, the analysis engine 526 may compile a model usage priority database 534. The analysis engine 526 also determines a priority of each application in the received databases, and stores the computed priorities in the model database 534. Statistical methods such as simple averaging, weighted averaging, curve fitting based on the distribution of usage data, etc. may be employed by the analysis engine 526 in compiling the model database 534 and in determining the application priorities. The model database 534 may also be stored in the data-storage module 530. Some embodiments provide only a single database that stores the data generated by both the aggregation module 524 and the analysis engine 526.

Each functional component described above may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A method of prioritizing the execution of applications by a computer, the method comprising:
   maintaining a remote database for computer applications requiring computing resources, the computer applications being associated with processes, the remote database being merged with at least one other database obtained from at least one other user computing device as a centralized execution priority database on a server, a common execution priority database being derivable from the centralized execution priority database based on the centralized execution priority database and distributable to at least one other user computing device to provide an initial execution priority database for the at least one other user computing device;
   programmatically monitoring and determining a user-specific usage pattern for each one of the computer applications, each of the user-specific usage patterns comprising at least one of: time of day when the computer application is used, duration for which the computer application is used, and usage frequency for the computer application during a specified time period;
   assigning, based on the determined user-specific usage patterns, an execution priority to (i) each one of the computer applications and (ii) each of the processes associated with each one of the computer applications, the execution priority assigned to at least one of the processes being higher than the execution priority assigned to the computer application with which it is associated, based on memory operations associated with the at least one process;
   updating the remote database with the assigned execution priorities;
   executing at least one of the computer applications in accordance with the assigned execution priorities;
   reassigning execution priorities to the at least one process and the computer application with which it is associated based on a time-based aspect of the determined user-specific usage patterns; and
   updating the remote database with the reassigned execution priorities.

2. The method of claim 1 further comprising allocating one or more computing resources to the computer applications based on the execution priorities such that execution of the computer applications is influenced by the user-specific usage patterns.

3. The method of claim 2, wherein the one or more computing resources comprise at least one of CPU time, memory, storage, and bandwidth.

4. The method of claim 1, wherein the user-specific usage patterns are associated with a user selected from a group consisting of an individual, a class of individuals, and an automatic processor.

5. The method of claim 1 wherein the computer applications comprise an operating system.

6. The method of claim 1 wherein the computer applications comprise a virtual machine.

7. The method of claim 1, wherein the processes associated with any one of the computer applications are assigned different execution priorities.

8. The method of claim 1, wherein each of the user-specific usage patterns further comprises at least one of: at least one function executed within the computer application, an active window within the computer application, and at least one transaction executed from within the computer application.

9. The method of claim 1 further comprising maintaining an additional database on the computer for the assigned and reassigned execution priorities.

10. The method of claim 1, wherein the common execution priority database is derivable by statistically analyzing the execution priorities stored in the centralized execution priority database.

11. The method of claim 1 further comprising recording the determined user-specific usage patterns.

12. The method of claim 1, wherein the at least one process is assigned the higher execution priority based on graphics operations associated with the at least one process.

13. The method of claim 1 further comprising:
additionally reassigning execution priorities to at least one of the other computer application and processes associated with the at least one other computer application based on the time-based aspect of the determined user-specific usage patterns; and
updating the remote database with the additionally reassigned execution priorities.

14. A system for prioritizing the execution of processes by a computer, the system comprising:
a processor;
a monitoring module configured to programmatically monitor and determine, using the processor, a user-specific usage pattern for each one of a plurality of computer applications, the computer applications being associated with processes, each of the user-specific usage patterns comprising at least one of: time of day when the computer application is used, duration for which the computer application is used, and usage frequency for the computer application during a specified time period;
a prioritization module configured to: (A) assign, based on the user-specific usage patterns, an execution priority to (i) each one of the computer applications and (ii) each of the processes associated with each one of the computer applications, the execution priority assigned to at least one of the processes being higher than the execution priority assigned to the computer application with which it is associated, based on memory operations associated with the at least one process, and (B) reassign execution priorities to the at least one process and the computer application with which it is associated based on a time-based aspect of the determined user-specific usage patterns; and
a data storage module configured to store, in a database, identities of the computer applications, the assigned execution priorities, and the reassigned execution priorities, the database being mergable, on a server, with at least one other database obtained from at least one other user computing device as a centralized execution priority database, a common execution priority database being derivable from the centralized execution priority database based on the centralized execution priority database and distributable to at least one other user computing device to provide an initial execution priority database for the at least one other user computing device.

15. The system of claim 14, wherein the prioritization module is further configured to allocate one or more computing resources to the computer applications based on the assigned execution priorities.

16. The system of claim 14 wherein the monitoring module, prioritization module and data storage module reside on the computer.

17. The system of claim 14, wherein the monitoring module is further configured to record the determined user-specific computer application usage patterns.

18. The system of claim 14, wherein the at least one process is assigned the higher execution priority based on graphics operations associated with the at least one process.

19. The system of claim 14, wherein the prioritization module is further configured to additionally reassign execution priorities to at least one of the other computer applications and processes associated with the at least one other computer application based on the time-based aspect of the determined user-specific usage patterns, and wherein the data storage module is further configured to update the database with the additionally reassigned execution priorities.

20. A centralized application-performance management system, the system comprising:
a processor;
a communications server configured to receive a plurality of databases, each of the databases being locally-compiled at a respective local machine associated with at least one user, and comprising identities of computer applications, corresponding user-specific usage patterns, and execution priorities that are based at least in part on the user-specific usage patterns, the computer applications being associated with processes, each of the user-specific usage patterns comprising at least one of: time of day when the corresponding computer application is used, duration for which the corresponding computer application is used, and usage frequency for the corresponding computer application during a specified time period;
an aggregation module configured to aggregate, using the processor, at least one of the identities, the user-specific usage patterns, and the execution priorities from the locally-compiled databases;
a central data storage module configured to store an aggregated database generated based on the aggregation; and
an analysis engine configured to:
(i) analyze the aggregated database to determine computer application usage patterns among the local machines;
(ii) assign, based on the determined usage patterns, an execution priority to each one of the computer applications and each of the processes associated with each one of the computer applications, the execution priority assigned to at least one of the processes being higher than the execution priority assigned to the computer application with which it is associated, based on memory operations associated with the at least one process;
(iii) reassign execution priorities to the at least one process and the computer application with which it is associated based on a time-based aspect of the determined user-specific usage patterns; and
(iv) compile a model application usage priority database based at least in part on the analysis of the aggregated database, the communications server being further configured to distribute the model application usage priority database to at least one local machine.

21. The system of claim 20, wherein the at least one process is assigned the higher execution priority based on graphics operations associated with the at least one process.

* * * * *